Figure 1:
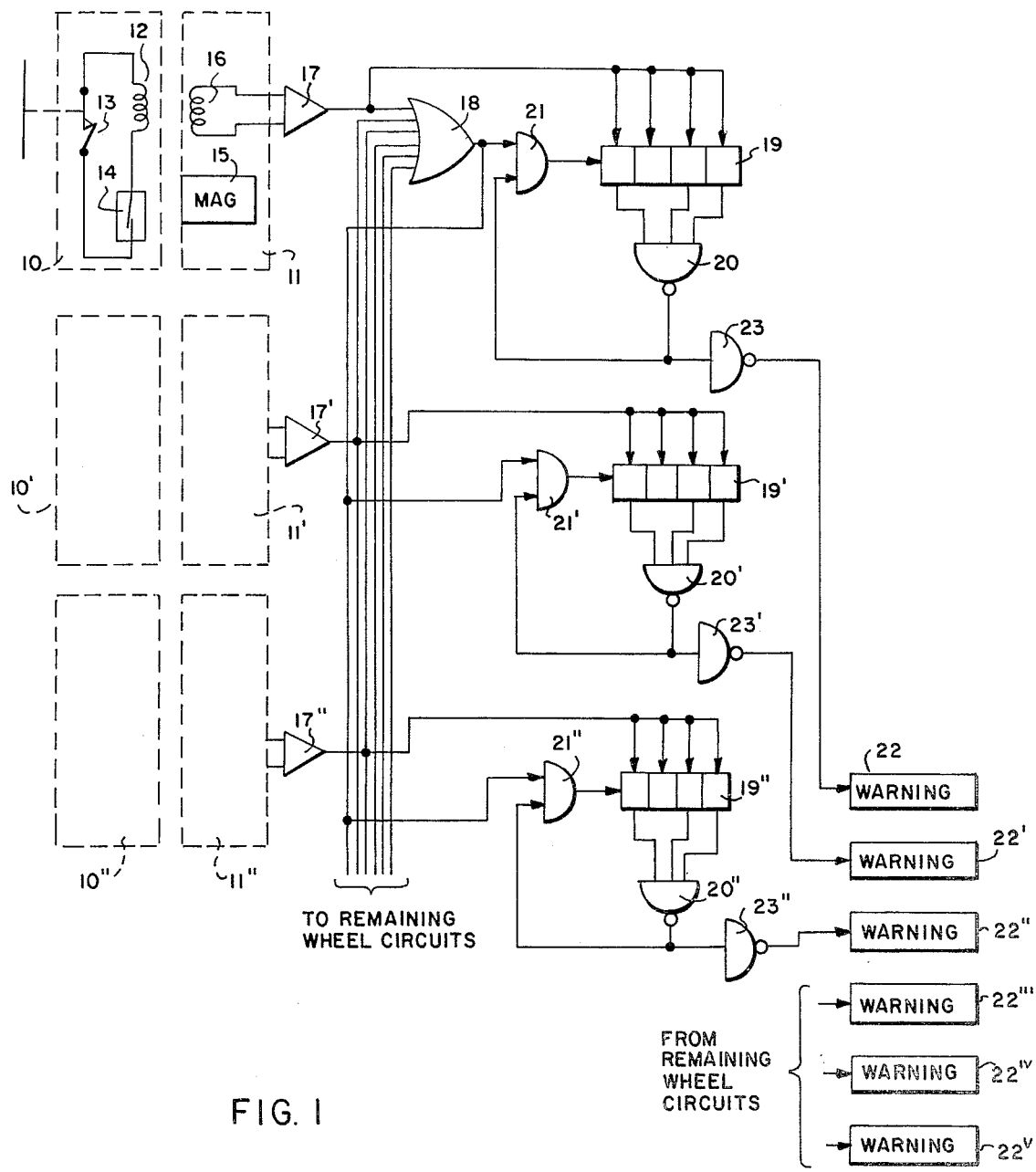

United States Patent [19]

Hill et al.

[11] 4,130,817

[45] Dec. 19, 1978

[54] TIRE PRESSURE WARNING DEVICES

[75] Inventors: William F. Hill, Stafford; Allan E. Clark, Lichfield, both of England

[73] Assignee: The Lucas Electrical Company Limited, Birmingham, England

[21] Appl. No.: 647,401

[22] Filed: Jan. 8, 1976

[30] Foreign Application Priority Data

Jan. 14, 1975 [GB] United Kingdom .................. 1482/75

[51] Int. Cl.² .............................................. B60C 23/02
[52] U.S. Cl. .................................... 340/58; 73/146.5; 200/61.25
[58] Field of Search .......................... 340/58, 268, 271; 200/61.22, 61.25; 324/160, 161, 167, 172; 73/146.3, 146.5, 146.8

[56] References Cited

U.S. PATENT DOCUMENTS

| 3,581,277 | 5/1971 | Beatty, Jr. et al. | 340/58 |
|---|---|---|---|
| 3,613,075 | 10/1971 | Griffiths et al. | 340/58 |
| 3,691,524 | 9/1972 | Frost et al. | 340/58 |
| 3,930,224 | 12/1975 | Whiteing et al. | 340/58 |
| 3,961,309 | 6/1976 | Eddy | 340/58 |

Primary Examiner—Donald J. Yusko
Assistant Examiner—Joseph E. Nowicki

[57] ABSTRACT

A vehicle tire pressure warning system includes a rotating assembly and a non-rotating assembly. The non-rotating assembly includes a magnet and a pick-up coil. The rotating assembly includes a series circuit comprising a coil, a magnetically operated switch and a pressure actuated switch which is closed when the tire pressure is adequate. The magnetic switch is closed periodically by the magnet and current is induced in the coil. When the magnetic switch re-opens the coil is coupled to the pick-up coil and the flux collapse in the coil causes a signal to be induced in the pick-up coil. The absence of such a signal indicates that the tire pressure is too low and is detected by a counter system for each wheel which counts the number of pulses from all the wheels between pulses from the associated wheel.

12 Claims, 3 Drawing Figures

TIRE PRESSURE WARNING DEVICES

This invention relates to tire pressure warning devices for road vehicles.

A tire pressure warning device is known in which a permanent magnet on a non-rotating part of the vehicle adjacent the wheel is used to induce the current flow in a coil on a rotating part of the wheel structure. A tire pressure operated switch which is closed when tire pressure is normal and a magnetically operable switch are connected in parallel with the coil. When tire pressure is normal the coil is always short-circuited. When the pressure operated switch opens, however, as a result of falling tire pressure, and the non-rotating permanent magnet opens the magnetically operated switch the flux in the coil will collapse suddenly whilst the coil is adjacent a pick-up on the non-rotating part of the vehicle, thereby inducing a voltage pulse in the pick-up.

Such a device has the disadvantage that it is not fail-safe, in that there is no output from the pick-up when tire pressure is normal. Thus any failure of the components on the wheel which resulted in there being no output from the pick-up would prevent the device from giving a warning of pressure loss.

It is an object of the invention to provide a tire pressure warning device with a fail-safe feature.

In its broadest aspect the invention resides in a tire pressure warning device comprising the combination of a non-rotating assembly for mounting on a non-rotating part of a vehicle and a rotating assembly for mounting on a wheel of the vehicle so that it passes adjacent the non-rotating assembly, said rotating assembly including energy storage means adapted to be energised by movement of the rotating assembly past the non-rotating assembly, a pressure actuated switch sensitive to tire pressure and arranged to close at normal tire pressure and synchronising switch means operable to permit release of the energy stored by energy storage means whilst the storage device is adjacent a pick-up forming part of the non-rotating assembly, the arrangement being such that said release of energy is prevented if the pressure operated switch opens.

The energy storage means may be a coil which coacts with a magnet forming part of the non-rotating assembly.

In the simplest form of the invention the synchronising switch is a magnetically operated switch operated by the same magnet. The two switches and the coil are simply connected in series.

Alternatively the synchronising switch which may be a voltage sensitive solid state switch arranged to "open" when the voltage across the coil exceeds a predetermined value.

As a further alternative the energy storage means may comprise the combination of a coil which coacts with a magnet in the non-rotating assembly and a capacitor which is charged by the coil when the pressure switch is closed and which discharges through the coil under the control of the synchronising switch means.

The synchronising switch means may again be a voltage sensitive solid state switch. Preferably the synchronising switch means is sensitive to the reversal of the voltage induced in the coil as it passes the magnet.

Figure 2:
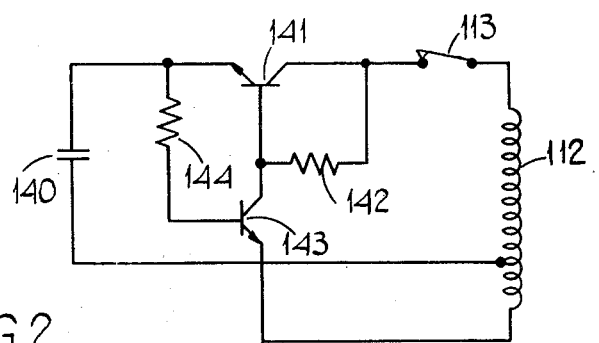
Figure 3:
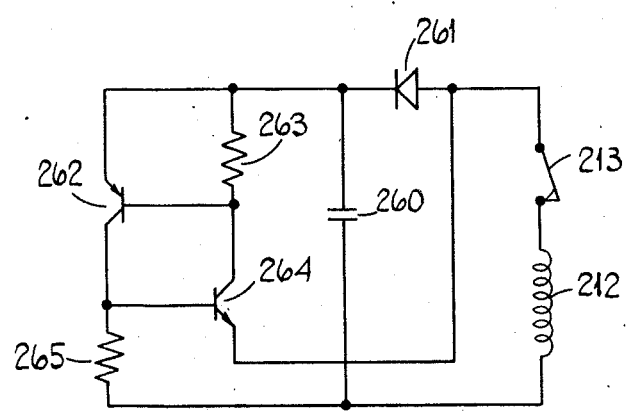

In the accompanying drawings:

FIG. 1 is the electrical circuit diagram of one example of a tire pressure warning device in accordance with the invention, and FIGS. 2 and 3 are the circuit diagrams of two alternative forms of rotating assemblies for the device of FIG. 1.

Referring firstly to FIG. 1, the device includes a rotating assembly 10 and a non-rotating assembly 11 which are respectively mounted in use on a wheel and a part of the vehicle structure adjacent the wheel. The rotating assembly comprises a coil 12, a normally closed magnetically operated reed switch 13 and a pressure switch 14 sensitive to tire pressure and arranged to close when the tire pressure is normal. The coil and the two switches are connected in a simple series circuit.

The non-rotating assembly includes a permanent magnet 15 which both coacts with coil 12 to induce a voltage in it when the coil passes the magnet and also opens the switch 14. A pick-up 16 is also included and is arranged to be adjacent the coil 12 when the switch 14 is adjacent the magnet 15.

In use, at normal tire pressures, the switch 13 is closed so that as the coil passes the magnet 15 current is induced in the series circuit and energy is stored by the coil. When the switch 14 is opened by the magnet 15 the current is interrupted and a voltage pulse is induced in the pick-up 16 as the flux in the coil 12 collapses.

If the switch 13 opens, no current will flow and no energy will be stored. Any open-circuit fault in the rotating assembly or a short-circuit fault in the synchronising magnetically operated switch will also prevent an output pulse from being generated.

The pick-up 16 is connected to an amplifier 17 the output terminal of which is connected to one input terminal of an OR gate 18 which also has input from the corresponding circuits of pressure warning devices associated with other wheels of the vehicle. The output terminal of the amplifier 17 is also connected to the reset terminals of a four kit binary counter 19. Selected ones of the stage output terminals of this counter are connected to a NAND gate 20 the output terminal of which is connected to one terminal of an AND gate 21 having its other input terminal connected to the output terminal of the OR gate 18. The output terminal of the AND gate 21 is connected to the "clock" terminal of the counter 19.

In normal use with sufficient pressure in each tire of the vehicle each counter 19 will count the pulses received from the warning devices of the other wheels and will be reset by each pulse from the warning device associated with its own wheel.

The connections to the NAND gate 20 are such that this normally produces no output, since the counter is reset in each count cycle before reaching the appropriate count state. Should a reset pulse fail to be received, however, the pulse from the other wheel circuits will continue to clock the counter, so that if the tire pressure falls below the normal value the counter 19 will attain the count state appropriate to switch off the output of the gate 20. The gate 21 will then be blocked to inhibit further counting and the counter 19 will remain in that count state until a further reset pulse is received.

A warning display 22 is driven by an inverter 23 connected to the output of the gate 20 and informs the driver of the vehicle when the tire pressure falls. The count state of the counter 19 required to inhibit the gate 23 is chosen to be about twice the number of wheels of the vehicle to prevent accidental triggering of the warning such as may occur for example when the invention is applied to an articulated vehicle where, in sharp cornering, wide variations in wheel speeds occur. In the example shown thirteen pulses are required to achieve this count state so that the circuit would be suitable for a six-wheeled vehicle.

In a modification of the above described example the reed switch may be of the normally open type (which are less expensive than the normally closed type). This would be situated so as to be closed by the magnet when the coil is also adjacent the magnet and to re-open when the coil is adjacent the pick-up.

Turning now to the circuit shown in FIG. 2 the synchronising switch in this case is a voltage sensitive solid state switch but the energy storage means is again a coil 112 in series with the pressure switch 113. The coil 112 has a tapping adjacent one end and this tapping is connected via a capacitor 140 to the emitter of an n-p-n transistor 141 which has its collector connected via the switch 113 to one end of the coil 112. A resistor 142 connects the collector of the transistor 141 to the base thereof. A second n-p-n transistor 143 has its collector connected to the base of the transistor 141 and its base connected via a resistor 144 to the emitter of the transistor 141. The emitter of the transistor 143 is connected to the opposite end of the coil 112 (i.e. the end adjacent the tapping).

In use, when the switch 113 is closed and the coil 112 passes the magnet of the non-rotating assembly a voltage is induced at the end of the coil furthest from the tapping which is initially positive with respect to the tapping. This voltage is applied to the collector of the transistor 141 which is biased to conduct by the resistor 142. Current will flow into the capacitor 140 charging it positively. Eventually the voltage across the capacitor 140 will rise to a sufficient level to forward-bias the base-emitter junction of the transistor 143 via the resistor 144. As the transistor 143 starts to conduct it removes the base current to the transistor 141, reducing the current drawn from the coil. This causes a back e.m.f. to be produced causing the voltage at the end remote from the tapping to rise further and that at the opposite end to fall. The falling voltage at this opposite end will turn transistor 143 on more and thus transistor 141 will be switched off rapidly. The required collapse of the flux in the coil 112 is thus achieved creating the output pulse from the pick-up as before.

If the switch 113 opens the circuit does not operate at all and no output pulses are obtained.

In the example shown in FIG. 3, the energy storage means is the combination of the coil 212, and a capacitor 260. The pressure switch 213 is again in series with the coil 212 and connects one end of the coil to the anode of a diode 261 which has its cathode connected to one side of the capacitor 260. The other side of the capacitor 260 is connected to the opposite end of the coil 212. The synchronising switch means is again a solid state switch using two transistors but this operates by detecting the change in polarity of the voltage across the coil 212 which occurs when the coil passes the magnet of the non-rotating assembly.

A p-n-p transistor 262 has its emitter connected to the cathode of the diode 261 and its base connected by a resistor 263 to its emitter. The collector of the transistor 262 is connected to the base of an n-p-n transistor 264 and by a resistor 265 to the other end of the coil 212. The collector of the transistor 264 is connected to the base of the transistor 262 and its emitter is connected to the anode of the diode 261.

In operation, with the switch 213 closed, the end of the coil 212 connected to the switch 213 initially takes a positive voltage relative to the other end as the coil starts to pass the magnet. The capacitor 260 is thus charged via the diode 261 but the transistors 262, 264 do not conduct since both are reversed biased. The capacitor 260 thus charges to the peak positive-going voltage induced in the coil 212 and holds this charge when the positive-going part of the pulse dies away. Continuing movement of the coil past the magnets causes a negative-going voltage pulse to commence, but this is blocked by the diode 261 and does not discharge the capacitor 260. This negative-going voltage applies a forward bias to the transistor 264 which starts to conduct and both transistors, which form a latch, switch rapidly on. The capacitor 260 then discharges rapidly through the coil 212 via the switch 213 and the two transistors. The voltage step applied to the coil 212 induces a signal in the pick-up.

When the switch 213 is open the circuit is inoperative and no output signal is induced in the pick-up.

In yet another example of the invention (not illustrated) the coil has a core of a known magnetic material which has but two magnetic states between which it is switched according to the strength of the magnetic field in which it is situated. No reed switch or electronic switch is required. The device operates by changing its magnetic state at a predetermined position thereby inducing a substantial e.m.f. in the coil. In this case, adequate e.m.f. is induced in the coil by movement past the predetermined position, however slowly, i.e. there is no threshold speed, unlike the other examples. The coil is used to provide electrical energy for detection by the pickup, when the pressure switch is closed. Since the sudden changes of state of the magnetic material produce sudden flux changes irrespective of the pressure switch, the pickup must be made non-responsive to such changes but responsive to coil current. Suitable means preferably are constituted by a separate coil or transmitter, in circuit with the coil and pressure switch, and positioned to co-operate with the pickup.

We claim:

1. A tire pressure warning device comprising the combination of a non-rotating assembly for mounting on a non-rotating part of a vehicle and including a pick-up, and a rotating assembly for mounting on a wheel of the vehicle so that it passes adjacent the non-rotating assembly, said rotating assembly including a single coil adapted to be energized by movement of the rotating assembly past the non-rotating assembly, a pressure actuated switch sensitive to tire pressure and arranged to close at normal tire pressure, and synchronizing switch means operable to permit release of the energy stored by said coil whilst said coil is adjacent said pick-up, said single coil, pressure actuated switch and synchronizing switch means being arranged in series, the arrangement being such that said release of energy is prevented if the pressure operated switch opens.

2. A tire pressure warning device as claimed in claim 1 in which said coil coacts with a magnet forming a part of said non-rotating assembly.

3. A tire pressure warning device as claimed in claim 2 in which said synchronizing switch is a magnetically operated switch coacting with said magnet.

4. A tire pressure warning device as claimed in claim 2 in which the synchronising switch is a voltage sensitive solid state switch arranged to open when the voltage across the coil exceeds a predetermined value.

5. A tire pressure warning device as claimed in claim 4 in which the voltage sensitive solid state switch comprises a transistor having a base and a collector-emitter connected in series with the coil, the pressure actuated switch and a resistor, a further transistor having a collector connected to the junction of said resistor and the pressure actuated switch, said further transistor having a base connected to the collector of the first mentioned transistor, and having an emitter connected via a capacitor to a tapping on the coil and via a resistor to the base of said first mentioned transistor, the first mentioned transistor being regeneratively switched on when the voltate on the capacitor reaches a predetermined value.

6. A tire pressure warning device as claimed in claim 1 in which said coil coacts with a magnet in the non-rotating assembly and said rotating assembly further comprises a capacitor connected by the pressure actuated switch to the coil, so as to be charged by the coil when said pressure actuated switch is closed, the capacitor being discharged through the coil under the control of the synchronizing switch means.

7. A tire pressure warning device as claimed in claim 6 in which said synchronising switch is a voltage sensitive solid state switch.

8. A tire pressure warning device as claimed in claim 7 in which said solid state switch is arranged to operate on reversal of the voltage induced in the coil as it passes the magnet.

9. A tire pressure warning device as claimed in claim 8 in which the capacitor is connected in series with a diode, the pressure actuated switch and the coil, the diode permitting charging of the capacitor by the coil but preventing discharging thereof through the coil, the solid state switch comprising two transistors having collector-emitter paths connected respectively across the capacitor and across the diode, each transistor having a base and a collector, with the base of each transistor connected to the collector of the other so that coil voltage reversal causes regenerative switching of the transistors into a conductive state to discharge the capacitor.

10. A vehicle pressure warning system including a plurality of tire pressure warning devices associated respectively with a plurality of wheels of the vehicle, each tire pressure warning device comprising the combination of a non-rotating assembly for mounting on a non-rotating part of a vehicle and including a pick-up, and a rotating assembly for mounting on a wheel of the vehicle so that it passes adjacent the non-rotating assembly, said rotating assembly including a single coil adapted to be energized by movement of the rotating assembly past the non-rotating assembly, a pressure actuated switch sensitive to tire pressure and arranged to close at normal tire pressure, and synchronizing switch means operable to permit release of the energy stored by said coil whilst said coil is adjacent said pick-up, said single coil, pressure actuated switch and synchronizing switch means being arranged in series, the arrangement being such that said release of energy is prevented if the pressure operated switch opens, a plurality of counters associated with the respective devices and adapted to acquire a count state, a logic circuit connecting the pick-up of the respective devices to the counters so that each counter is periodically reset by pulses produced by its associated device and counts pulses produced by all the other devices, warning means, and means sensitive to the count state of each counter to make operative said warning means if the count state of a counter exceeds a predetermined value.

11. A system as claimed in claim 10 in which said means sensitive to the count state of each counter is also connected to the logic circuit so as to inhibit further counting when said predetermined value is reached.

12. A system as claimed in claim 11 in which said logic circuit includes an OR gate connected to all the pick-ups and having an output terminal, a plurality of AND gates each having two input terminals, one input terminal connected to the output terminal of the OR gate and an output terminal, the output terminal of each AND gate being connected to a CLOCK terminal of an associated one of the counters, a plurality of logical inverters, and said means sensitive to the count state of each counter comprising a NAND gate having input terminals connected to the output terminals of an associated counter and an output terminal connected via an associated logical inverter to the warning means and also connected to the other input terminal of an associated AND gate.

* * * * *